(12) United States Patent
Krieger et al.

(10) Patent No.: US 7,345,450 B2
(45) Date of Patent: Mar. 18, 2008

(54) MICROPROCESSOR CONTROLLED BOOSTER APPARATUS WITH POLARITY PROTECTION

(75) Inventors: Michael Krieger, Miami Beach, FL (US); Bruce Randolph, Ft. Lauderdale, FL (US)

(73) Assignee: Vector Products, Inc., Ft. Lauderdale, FL (US)

( * ) Notice: Subject to any disclaimer, the term of this patent is extended or adjusted under 35 U.S.C. 154(b) by 18 days.

(21) Appl. No.: 10/315,061

(22) Filed: Dec. 10, 2002

(65) Prior Publication Data

US 2004/0130298 A1    Jul. 8, 2004

Related U.S. Application Data

(60) Provisional application No. 60/357,146, filed on Feb. 19, 2002, provisional application No. 60/369,839, filed on Apr. 5, 2002.

(51) Int. Cl.
*H02J 7/00*    (2006.01)

(52) U.S. Cl. ........................ 320/104; 320/105

(58) Field of Classification Search ................. 320/105, 320/103, 104, 134, 136, 165; 324/426, 429
See application file for complete search history.

(56) References Cited

U.S. PATENT DOCUMENTS

| | | | |
|---|---|---|---|
| 3,293,529 A | 12/1966 | Fontaine | |
| 3,500,167 A | 3/1970 | Applegate et al. | |
| 3,564,393 A | 2/1971 | Williamson | |
| 3,617,850 A | 11/1971 | Domshy | |
| 3,652,915 A | 3/1972 | Eberts | |
| 3,673,485 A | 6/1972 | Vital et al. | |
| 3,787,754 A | 1/1974 | Seabase | |
| 3,852,732 A | 12/1974 | Yorksie et al. | |
| 3,938,018 A | 2/1976 | Dahl | |
| 4,021,717 A | 5/1977 | Furuishi et al. | |
| 4,031,449 A | 6/1977 | Trombly | |
| 4,061,956 A | 12/1977 | Brown et al. | |
| 4,180,746 A | 12/1979 | Giuffra | |
| 4,215,306 A | 7/1980 | Mace | |
| 4,217,534 A | 8/1980 | Cole | |
| 4,260,943 A | 4/1981 | Zaderej et al. | |
| 4,374,355 A | 2/1983 | Steigerwald | |
| 4,376,263 A | 3/1983 | Pittroff | |
| 4,420,212 A | 12/1983 | Wright | |
| 4,638,236 A | 1/1987 | Carr | |
| 4,667,141 A | 5/1987 | Steele | |
| 4,692,681 A | 9/1987 | Nilssen | |
| 4,710,694 A * | 12/1987 | Sutphin et al. | 320/139 |

(Continued)

OTHER PUBLICATIONS

Microsoft Press, Computer Dictionary, Third Edition, p. 442.*

*Primary Examiner*—Bao Q. Vu
*Assistant Examiner*—Samuel Berhanu
(74) *Attorney, Agent, or Firm*—Venable, LLP; Jeffri A. Kaminski

(57) ABSTRACT

A polarity protection circuit for a battery booster device is provided. According to an exemplary embodiment, the polarity protection circuit is comprised of solid-state devices. Preferably no mechanical or electro-mechanical devices, such as solenoids are included in the polarity protection circuit. The polarity protection circuit is electrically connected to the battery to be charged and to the boosting battery. The polarity protection circuit prevents current flow between the batteries unless proper polarity is achieved.

21 Claims, 3 Drawing Sheets

U.S. PATENT DOCUMENTS

| | | | |
|---|---|---|---|
| 4,742,290 A | 5/1988 | Sutphin | |
| 4,769,586 A * | 9/1988 | Kazmierowicz | 320/105 |
| 4,847,545 A | 7/1989 | Reid | |
| 4,871,957 A | 10/1989 | Taranto et al. | |
| 4,871,959 A | 10/1989 | Gali | |
| 4,902,955 A | 2/1990 | Manis et al. | |
| 4,972,135 A | 11/1990 | Bates et al. | |
| 5,063,341 A | 11/1991 | Gali | |
| 5,083,076 A | 1/1992 | Scott | |
| 5,084,664 A | 1/1992 | Gali | |
| 5,113,127 A | 5/1992 | Hoffman | |
| 5,172,045 A * | 12/1992 | Takeyasu | 320/103 |
| 5,189,359 A * | 2/1993 | Kronberg | 320/103 |
| 5,254,952 A * | 10/1993 | Salley et al. | 324/429 |
| 5,270,635 A | 12/1993 | Hoffman | |
| 5,276,393 A | 1/1994 | Gali | |
| 5,281,904 A | 1/1994 | Tomkins | |
| 5,461,297 A | 10/1995 | Crawford | |
| 5,469,042 A | 11/1995 | Ruhling | |
| 5,493,197 A * | 2/1996 | Eguchi et al. | 320/116 |
| 5,541,495 A | 7/1996 | Gali | |
| 5,563,496 A | 10/1996 | McClure | |
| 5,596,974 A | 1/1997 | Hall et al. | |
| 5,633,575 A | 5/1997 | Gali | |
| 5,635,817 A * | 6/1997 | Shiska | 320/105 |
| 5,635,818 A * | 6/1997 | Quintero | 320/105 |
| 5,637,978 A | 6/1997 | Kellett et al. | |
| 5,646,507 A | 7/1997 | Timmons et al. | |
| RE35,643 E | 10/1997 | Gali | |
| 5,773,955 A | 6/1998 | Hall | |
| 5,793,185 A | 8/1998 | Prelec et al. | |
| 5,796,255 A * | 8/1998 | McGowan | 324/429 |
| 5,955,867 A * | 9/1999 | Cummings et al. | 320/107 |
| 5,965,998 A * | 10/1999 | Whiting et al. | 320/165 |
| 5,969,625 A * | 10/1999 | Russo | 340/636.19 |
| 5,982,138 A | 11/1999 | Krieger | |
| 5,993,250 A | 11/1999 | Hayman | |
| 6,025,697 A | 2/2000 | Long et al. | |
| 6,031,356 A * | 2/2000 | Harada et al. | 320/119 |
| 6,057,665 A | 5/2000 | Herniter et al. | |
| 6,081,098 A | 6/2000 | Bertness et al. | |
| 6,091,245 A | 7/2000 | Bertness | |
| 6,130,519 A | 10/2000 | Whiting et al. | |
| 6,211,577 B1 | 4/2001 | Alksnat et al. | |
| 6,212,054 B1 | 4/2001 | Chan | |
| 6,215,273 B1 | 4/2001 | Shy | |
| 6,262,492 B1 * | 7/2001 | Sheng | 307/10.1 |
| 6,300,742 B1 | 10/2001 | Hung | |
| 6,344,733 B1 | 2/2002 | Crass et al. | |
| 6,356,050 B1 | 3/2002 | Hussaini | |
| 6,369,576 B1 | 4/2002 | Matthews et al. | |
| 6,424,158 B2 | 7/2002 | Klang | |
| 6,445,158 B1 * | 9/2002 | Bertness et al. | 320/104 |
| 6,515,456 B1 * | 2/2003 | Mixon | 320/160 |
| 6,609,357 B1 * | 8/2003 | Davis et al. | 56/10.2 A |

* cited by examiner

MICROPROCESSOR CONTROLLED BOOSTER APPARATUS WITH POLARITY PROTECTION

CROSS-REFERENCE TO RELATED APPLICATIONS

This application claims priority from U.S. Provisional Application Ser. Nos. 60/357,146 filed Feb. 19, 2002 and 60/369,839 filed Apr. 5, 2002, the contents of both of which are incorporated herein by reference.

FIELD OF THE INVENTION

The present invention relates to a booster device used for boosting a depleted battery and in particular to microprocessor control of the booster apparatus and a polarity protection circuit.

BACKGROUND OF THE INVENTION

It is well known that when an engine of an automobile is not able to be started due to insufficient electric power, a battery of the automobile can be jump started by power from a battery of another automobile or from a battery in a booster device to thereby start the engine.

To boost the battery of the automobile which is of insufficient electric power by power from another battery, the two batteries must be connected through a pair of electric wires. For example, the positive terminal of the depleted battery should be connected to the positive terminal of the boosting battery. The negative terminals of the two batteries should be connected in a corresponding manner.

Making this connection, however, can be very dangerous if the batteries are connected incorrectly. A battery has a small internal resistance, and there is a voltage difference between a battery with sufficient electric power and a battery with insufficient electric power. Current will thus flow between the two batteries as soon as a connection is made. When the two batteries are connected correctly, which means that terminals of corresponding polarities are connected respectively as described above, a large current passes through the electric wires. When the two batteries are connected erroneously, a current which passes through the electric wires is 10 to 20 times larger than the current existing on the electric wires when the batteries are correctly connected. Additionally, incorrect connection may result in one or both of the batteries being short-circuited. Under such conditions, one or both of the batteries may be damaged, and in some cases, an explosion, fire and damage to the vehicle or to a person may result.

Thus, there is a need for a device, which can be used to ensure that the connection of the two batteries is made correctly and in a safe manner. The device should minimize any risk resulting from incorrect connection between the two batteries and from a short-circuit of one or both of the batteries.

The failure of an engine of an automobile to start due to insufficient electric power, in addition to being due to a battery with insufficient power, may also be due to a bad alternator that has failed to replenish the charge on an otherwise good battery. With a bad alternator, even if the battery is replaced, the new battery does not accumulate electric charge, and its charge is soon drained out again. A bad alternator needs to be replaced in order to prevent recurring low battery problems. Detecting a bad alternator, however, is not an easy task to an inexperienced person.

Also, other simple tasks such as checking the air pressure of a tire, checking for freon gas leakage, and inflating a tire to a proper pressure can often be difficult to those without the necessary experience and know-how. It would also be convenient to know the state of the charge of the jump starter battery itself, as well as the state of charge the depleted battery before and after a jump start.

There is therefore a need for a self-contained jump starter system that can be used as a jump starter, tester, and diagnostic system for a vehicle to assist in performing vehicle diagnostics and minor vehicle repairs. There is also a need for a portable, self-contained jump starter system of the above type that is rugged, has a minimum number of components, is user friendly to people who are not experienced with automobiles, provides self-testing and vehicle diagnostics, and is relatively inexpensive so as to be affordable by a large number of consumers.

SUMMARY OF THE INVENTION

A polarity protection circuit is provided. According to an exemplary embodiment, the polarity protection circuit is comprised of solid-state devices. Preferably no mechanical or electro-mechanical devices, such as solenoids are included in the polarity protection circuit. The polarity protection circuit is electrically connected to the battery to be charged (depleted battery) and to a boosting battery or other power source. The polarity protection circuit prevents current flow between the batteries unless proper polarity is achieved. The polarity protection circuit is described below in the context of a battery booster device, but it can be used in conjunction with any charging or boosting device.

Typically, a battery booster device comprises a pair of cables connected at one end to a built-in battery or other power source arranged in a portable box. The other ends of the cables are connected to a pair of alligator clamps. The built-in battery provides a DC power source for boosting a depleted battery. When the clamps are connected to the depleted battery, current flows from the built-in battery of the battery booster device to the depleted battery. As mention above, a polarity protection circuit is provided in the booster device and prevents current flow between the batteries unless a proper polarity connection between the two batteries is achieved.

In a further embodiment, the battery booster device may also comprise a microprocessor. The microprocessor can be used as part of a polarity protection circuit. It may also perform additional detection and control functions, such as detecting a bad alternator, detecting a freon leak, and detecting low tire pressure and controlling an air compressor to address the low tire pressure. In connection with this, the booster device may further include a display and/or other notification devices, such as a visual or audio indicator.

In another embodiment of the invention, a polarity detection circuit is provided. The circuit comprises: cables for connecting a boosting battery to a depleted battery; a polarity sensing circuit coupled to the boosting battery for providing an enable signal when a correct polarity connection is made between the boosting battery and the depleted battery; and a solid state switch coupled to the polarity sensing circuit, the solid state switch permitting current flow between the boosting battery and the depleted battery when it receives the enabling signal.

In another exemplary embodiment, a booster apparatus is provided. The apparatus comprises: a boosting battery having a positive terminal and a negative terminal; a first cable coupled to the positive terminal of the boosting battery and having a clamp for connection to a terminal of a depleted battery; a second cable coupled to the negative terminal of the boosting battery and having a clamp for connection to another terminal of the depleted battery; a solid state switch arranged in series with one of the cables; a polarity sensing circuit coupled between the first cable and the second cable, the polarity sensing circuit providing an enable signal to place the solid state switch in a conducting state when a correct polarity connection is made between the boosting battery and the depleted battery.

In a further embodiment, a booster apparatus comprises: means for providing power; means for connecting the means for providing power to a depleted battery; means for detecting polarity of the connection between the means for providing power and the depleted battery and for generating an enable signal when correct polarity is detected; and at least one field-effect transistor (FET) having a control electrode and being coupled to the means for detecting polarity, the control electrode receiving the enable signal and turning the FET on to allow current flow between the means for providing power and the depleted battery.

In another embodiment, a jump starter system comprises: a boosting battery having positive and negative terminals; a pair a battery cables having first ends connected to the positive and negative terminals, respectively, of the boosting battery and second ends adapted for connection to positive and negative terminals of a depleted battery; a semiconductor switch connected electrically with one of the terminals of the boosting battery and the battery cable respectively connected thereto; a polarity sensing circuit coupled to the battery cables and producing a first signal only when the battery cables connect the positive terminal of the boosting battery to the positive terminal of the depleted battery and the negative terminal of the boosting battery to the negative terminal of the depleted battery; and a microprocessor coupled to the semiconductor switch and the polarity sensing circuit and being responsive to the first signal from the polarity sensing circuit for activating the semiconductor switch to enable a current flow between the boosting battery and the depleted battery.

In another embodiment, a computer-readable information storage medium for use with a computer controlling a jump starter system, comprising a first battery having positive and negative terminals, a pair a battery cables having first ends connected to the positive and negative terminals, respectively, of the first battery and second ends adapted for connection to positive and negative terminals of a depleted battery in a vehicle, the computer-readable information storage medium stores computer-readable program code for causing the computer to perform the steps of: checking for a rapid rise in voltage after the vehicle has been started; indicating the alternator is working properly if the rapid rise in voltage is present; and indicating the alternator is not working properly if the rapid rise in voltage is not present.

In another embodiment, a computer-readable information storage medium for use with a computer controlling a jump starter system, comprising a first battery having positive and negative terminals, a pair a battery cables having first ends connected to the positive and negative terminals, respectively, of the first battery and second ends adapted for connection to positive and negative terminals of a depleted battery, the computer-readable information storage medium stores computer readable program code for causing the computer to perform the steps of: measuring a charge rate of the battery; determining an amount of time the battery has been receiving a current; measuring a voltage of the battery; and detecting an overtime fault if the charge rate is greater than a predetermined current, the battery has been receiving a current longer than a predetermined amount of time, and the voltage of the battery is greater than or equal to a predetermined voltage.

In another embodiment, a computer-readable information storage medium for use with a computer controlling a jump starter system, comprising a first battery having positive and negative terminals, a pair a battery cables having first ends connected to the positive and negative terminals, respectively, of the first battery and second ends adapted for connection to positive and negative terminals of a depleted battery, the computer-readable information storage medium stores computer-readable program code for causing the computer to perform the steps of: measuring a charge rate of the battery; determining an amount of time the battery has been receiving a current; measuring a voltage of the battery; and detecting a shorted cell battery fault if the charge rate is greater than a predetermined current, the battery has been receiving a current more a predetermined amount of time, and the voltage of the battery is less than or equal to a predetermined voltage.

In another embodiment, a computer-readable information storage medium for use with a computer controlling a jump starter system, comprising a first battery having positive and negative terminals, a pair a battery cables having first ends connected to the positive and negative terminals, respectively, of the first battery and second ends including clamps adapted for connection to positive and negative terminals of a depleted battery, the computer-readable information storage medium stores computer-readable program code for causing the computer to perform the steps of: measuring a voltage at the clamps; indicating a bad battery fault if no voltage is detected at the clamps; and proceeding with a jump starting operation if a voltage is detected at the clamps.

In another embodiment, a computer-readable information storage medium for use with a computer controlling jump starter system, comprising a first battery having positive and negative terminals, a pair a battery cables having first ends connected to the positive and negative terminals, respectively, of the first battery and second ends adapted for connection to positive and negative terminals of a depleted battery, the computer-readable information storage medium stores computer-readable program code for causing the computer to perform the steps of: measuring a charge current of the battery; determining an amount of time the battery has been receiving current; measuring a voltage of the battery; and detecting an open cell battery fault if the charge current is less than a predetermined current, the battery has been receiving current more a predetermined amount of time, and the voltage of the battery is greater than or equal to a predetermined voltage.

DETAILED DESCRIPTION OF THE PREFERRED EMBODIMENTS

Figure 1:
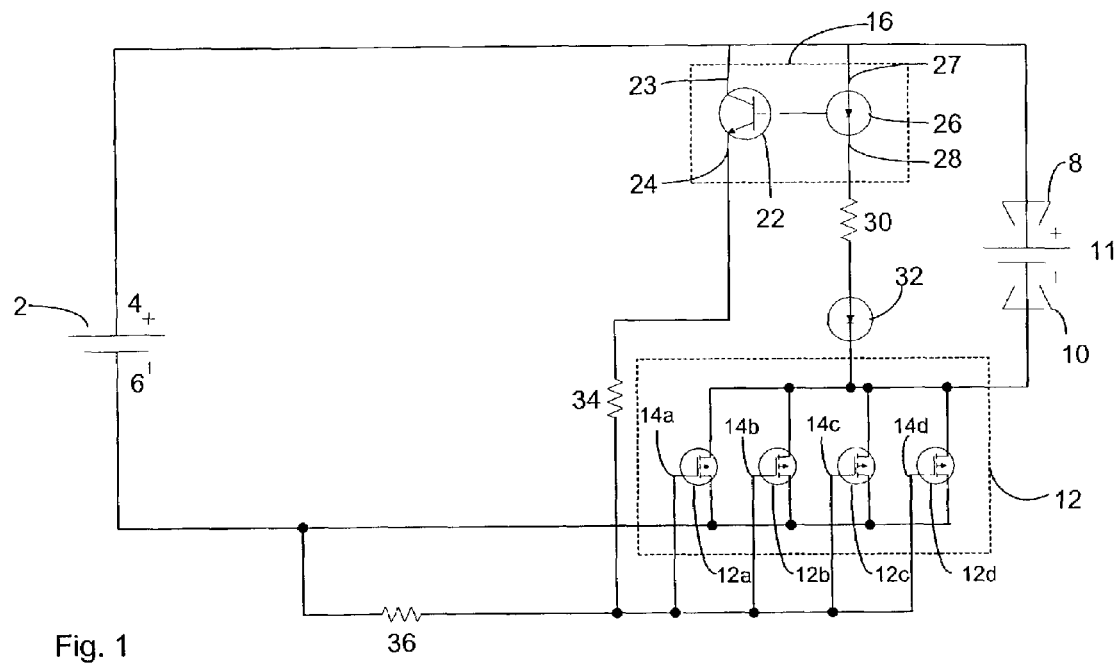
FIG. 1 is a circuit schematic that illustrates a polarity protection circuit according to a preferred embodiment of the invention.

FIG. 1 illustrates a battery booster device including a polarity protection circuit according to an exemplary embodiment of the invention. A boosting battery 2 with a positive terminal 4 and a negative terminal 6 is provided in the booster device. The positive terminal 4 of the boosting battery 2 is coupled to one of a pair of alligator clamps 8, 10 to be connected to a battery to be charged 11 (depleted battery) via a wire or battery cable. The negative terminal 6 of the boosting battery 2 is connected to the other of the alligator clamps 8, 10 to be connected to the battery to be charged 11 via a wire or battery cable.

A switch 12 is coupled to one of the wires or battery cables to be connected to the depleted battery 11. The switch 12 is activated to complete a boosting circuit between the boosting battery 2 and the depleted battery 11 only when a correct polarity connection between the batteries is attained. In the embodiment shown, the switch 12 is arranged between the negative terminal 6 of the boosting battery 2 and the alligator clamp 10 intended to be connected to the negative terminal of the depleted battery 11. The switch 12 is thus a current handling device and part of the boosting circuit. Of course, other locations of the switch in the boosting circuit are possible.

The switch 12 is preferable a solid state device, such as a transistor, diode, field effect transistor (FET), etc. FIG. 1 represents the switch 12 as a number FETs 12a-12d connected in parallel with each other. The FETs 12a-12d are preferably high power, very low on-resistance types. The number of FETs provided depends upon the current flow in the circuit and the type of FET used. Control electrodes 14a-14d of the FETs 12a-12d are electrically connected to the negative terminal 6 of the boosting battery through a resistor 36. This arrangement maintains the FETs 12a-12d in an off or non-conducting state when there is no voltage at the clamps, preventing current flow from the boosting battery 2 to clamps 8, 10 and to the depleted battery 11.

The switch 12 is activated by a polarity sensing circuit 16 to allow current flow from the boosting battery 2 to the depleted battery 11. The polarity sensing circuit 16 is coupled to the boosting battery 2 and to the depleted battery 11 when the clamps 8, 10 are connected to the depleted battery 11. The polarity sensing circuit 16 senses the polarity of the connection between the boosting battery 2 and the depleted battery 11 and provides a signal indicating the state of the connection. The signal from the polarity sensing circuit 16 is provided to the switch 12. When a proper polarity connection is signaled, the switch 12 completes the boosting circuit and permits current flow to the depleted battery 11.

In the embodiment shown in FIG. 1, the polarity sensing circuit comprises an opto-isolator 16. The opto-isolator 16 comprises a phototransistor 22 and a light emitting diode (LED) 26. A collector 23 of the phototransistor 22 and an anode 27 of the LED 26 are electrically connected to the positive terminal 4 of the boosting battery 2. The emitter 24 of the phototransistor 22 is electrically connected to control electrodes 14a-14d of the FETs 12a-12d comprising the switch 12 via resistor 34. The cathode 28 of the LED 26 is electrically connected to one of the electrodes of the FETs 12a-12d through resistor 30 and diode 32. The other of the electrodes of the FETs 12a-12d is electrically connected to the negative terminal 6 of the boosting battery 2.

During operation of the battery booster device depicted in FIG. 1, the FETs 12a-12d are initially held in a non-conducting state via resistor 36. The opto-isolator 16 only turns on when it is properly biased as a result of a correct polarity connection being made between the boosting battery 2 and the depleted battery 11. When the LED 26 is properly biased, phototransistor 22 in the opto-isolator 16 turns on. Current flow through phototransistor 22 biases the control electrodes of the FETs 12a-12d into a conducting state, enabling current flow through the FETs 12a-12d to the depleted battery 11. More specifically, when the depleted battery 11 is properly connected to the boosting battery 2 as shown in FIG. 1, the LED 26 and diode 32 are forward biased. Current thus flows through these diodes and resistor 30. Resistor 30 is provided to regulate the amount of current that flows through the opto-isolator 16. The current flow through LED 26, resistor 30 and diode 32 activates the phototransistor 22, turning it on. When the phototransistor 22 is turned on, current flows through the phototransistor 22, resistor 34 and to the control electrodes of the FETs 12a-12d. The control electrodes of the FETs 12a-12d are activated in response to this current, and the FETs 12a-12d are turned on into a conducting state. The boosting circuit is now closed, and current can flow from the boosting battery 2 through the FETs 12a-12d to the depleted battery 11. There is no need for any mechanical or electro-mechanical devices, as the FETs are the current handling devices.

Figure 2:
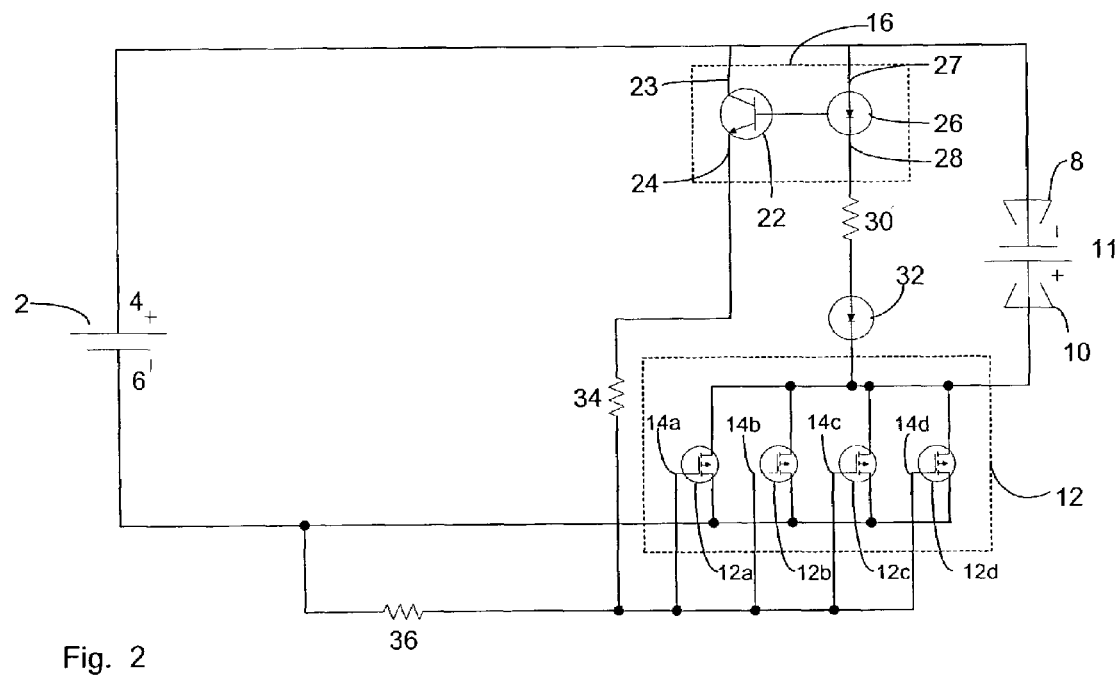
FIG. 2 is a circuit schematic that illustrates a polarity protection circuit according to another preferred embodiment of the invention.

When an improper polarity connection is made between the boosting battery 2 and the depleted battery 11, as shown in FIG. 2, the LED 26 in the opto-isolator 16 and diode 32 are reversed biased. Diode 32 prevents current flow from the depleted battery 11 in a reverse direction. Thus, there is essentially no current flow through the LED 26, diode 32 and resistor 30. Consequently, the phototransistor 22 in the opto-isolator 16 is in a non-conducting state. In turn, the FETs 12a-12d of the switch are in a non-conducting state, and there is essentially no current flow from the boosting battery 2 to the depleted battery 11, preventing a potentially dangerous situation.

Once a proper polarity connection is made between the batteries, the depleted battery 11 is charged or the vehicle is jump started. The alligator clamps 8, 10 are then disconnected from the battery to be charged 11. When the clamps are disconnected, diode 26 is no longer forward biased and no current flows therethrough, turning the phototransistor 22 in the opto-isolator off, which in turn, turns the FETs 12a-12d off. The boosting circuit is then, in effect, reset, preventing short-circuits or a reverse polarity connection being made after a proper polarity connection is made. In a further embodiment, described below in conjunction with FIG. 3, the battery booster device can be provided with a disable switch that interrupts the boosting circuit to ensure the safe disconnection of the clamps from the depleted battery 11 or a microprocessor or other circuitry can be programmed to detect when the depleted battery is disconnected.

Figure 3:
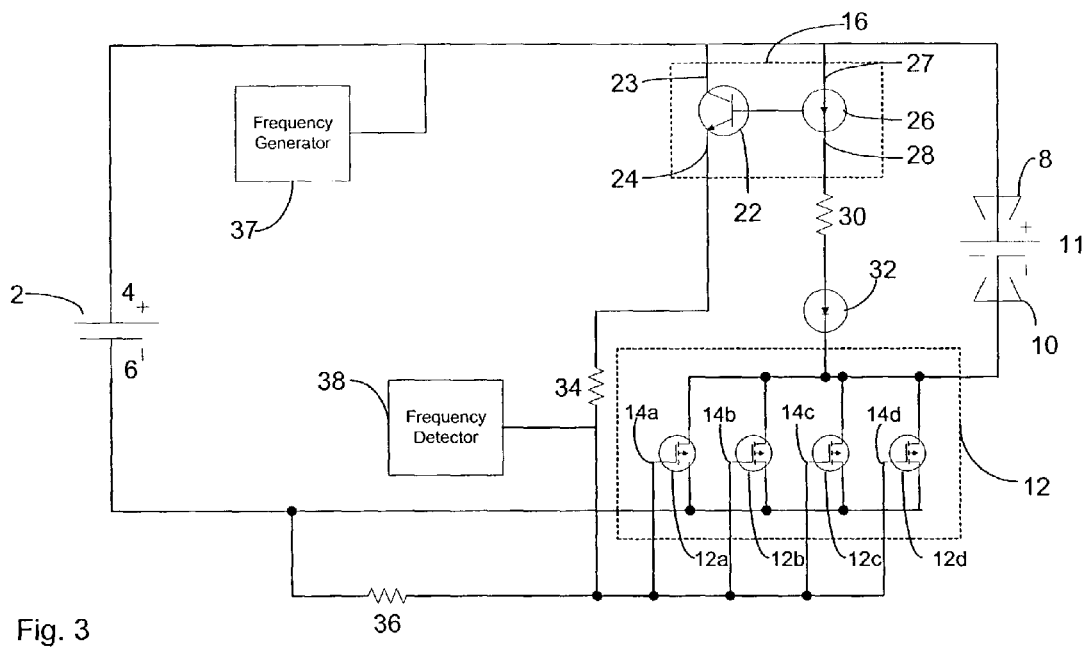
FIG. 3 is a circuit schematic that illustrates a polarity protection circuit according to another preferred embodiment of the invention.

Turning now to FIG. 3, another embodiment of the present invention is described. The embodiment shown in FIG. 3 operates in a similar manner to the embodiment described above in regard to FIG. 1. FIG. 3 differs from FIG. 1 in that FIG. 3 includes a frequency generator and a frequency detector. The frequency generator and frequency detector are used to detect disconnection of the clamps 8, 10 from the depleted battery 11 or other interruption of the boosting circuit. The frequency generator 37 is adapted to inject a signal of a particular frequency into the boosting circuit. A frequency detector 38 is adapted to detect the frequency injected into the boosting circuit by the frequency generator 37. The frequency generator 37 and frequency detector 38 are preferably arranged on opposite sides of depleted battery 11. When the depleted battery 11 is connected with proper polarity, a path exists for the frequency injected by the frequency generator 37 to travel through the circuit. The frequency detector 38 detects the injected frequency, and the battery boosting process proceeds normally. When the clamps 8, 10 are removed from the depleted battery 11 or the circuit is otherwise interrupted, current flow is stopped, and the frequency detector 38 no longer detects the frequency injected by the frequency generator 37. The frequency detector is adapted to then turn FETs 12a-12d to a non-conducting state, resetting the boosting circuit. This prevents short circuits or a reverse polarity connection being made after a proper polarity connection has been established.

Figure 4:
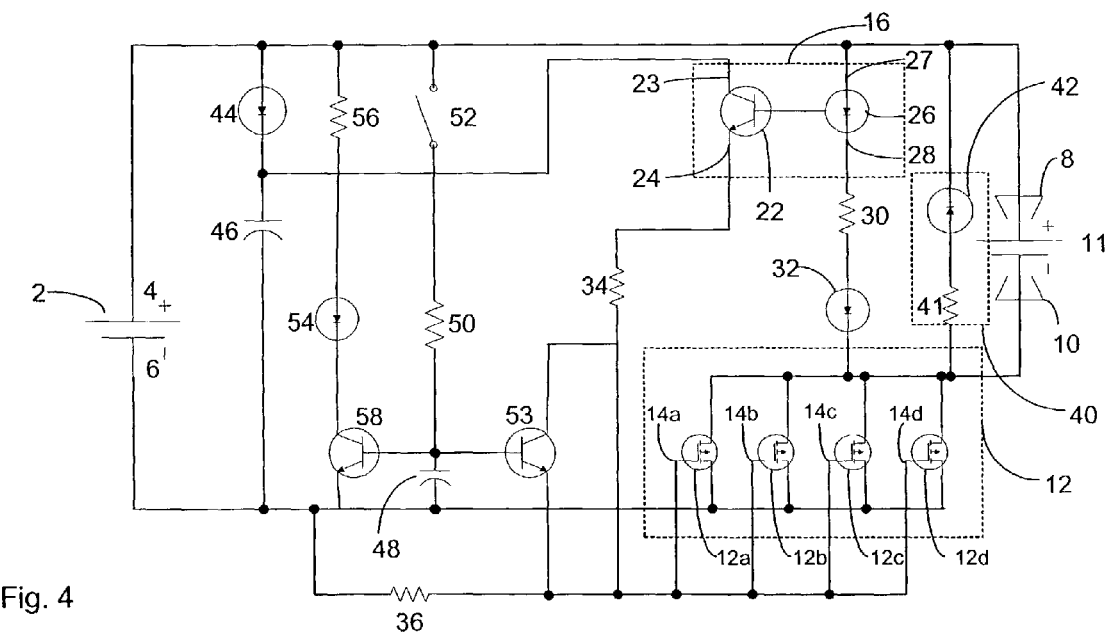
FIG. 4 is a circuit schematic that illustrates a polarity protection circuit according to another preferred embodiment of the invention.

FIG. 4 illustrates another embodiment of the present invention. The embodiment shown in FIG. 4 includes many of the same elements described above in connection with FIGS. 1-3. These same elements are labeled with the same reference numbers in all the figures. The circuit shown in FIG. 4 operates in a manner similar to that described above in regard to FIGS. 1-3, and only the differences are described in detail below.

The embodiment of the invention shown in FIG. 4 includes an indicator 40 for indicating when a proper polarity connection between booster battery 2 and depleted battery 11 is established. The indicator 40 may provide a visual or audio indication to a user that a proper polarity connection has or has not been established. The indicator 40 illustrated in FIG. 4 includes a resistor 41 and an LED 42. When the alligator clamps 8, 10 are connected to the depleted battery 11, the resistor 41 and LED 42 are connected across the terminals of the depleted battery 11. If the alligator clamps 8, 10 are connected to depleted battery 11 with an incorrect polarity, LED 42 is forward biased and is illuminated indicating an incorrect connection. However, essentially nothing else occurs in the boosting circuit. The opto-isolator 16 prevents any other current flow. For example, the LED 26 in the opto-isolator 16 and diode 32 are reversed biased, preventing current flow in a reverse direction. Thus, there is no current flow through these diodes and resistor 30. Consequently, the phototransistor 22 in the opto-isolator 16 remains off. In turn the FETs 12a-12d remain in a non-conducting state and there is no current flow from the boosting battery 2 to the depleted battery 11.

If the alligator clamps 8, 10 are connected to the depleted battery 11 with a proper polarity the LED 42 is reverse biased and is not illuminated. The opto-isolator 16 is turned on, and the boosting circuit is completed as described above in connection with FIG. 1.

In some instances during the jump-starting process, the voltage of the boosting battery 2 may drop to low levels, for example, 2 volts or lower. In such instances, the voltage of the boosting battery 2 may become insufficient to maintain the FETs 12a-12d in a conducting state. Thus, a means for maintaining the FETs 12a-12d in a conducting state is provided. In the embodiment shown in FIG. 4, this means comprises a diode 44 and a capacitor 46 arranged in series with each other and connected across the terminals 4, 6 of the boosting battery 2. An anode of diode 44 is coupled to the positive terminal 4 of the boosting battery 2. The collector of the phototransistor 22 in the opto-isolator 16 is coupled between the diode 44 and the capacitor 46. The combination of the diode 44 and the capacitor 46 provides a high level of gate voltage that is required to keep the FETs 12a-12d in a conducting state even if the boosting battery's voltage decays to a low level.

The embodiment of FIG. 4 also includes a means for interrupting the current flow to the depleted battery 11 after a proper polarity connection has been established. This means for interrupting allows for safe removal of the alligator clamps 8, 10 from the depleted battery 11. The means for interrupting in the illustrated embodiment includes a combination of capacitor 48, resistor 50, switch 52 and transistor 53. These elements are used to turn the FETs 12a-12d into a non-conducting state to allow for safe removal of the alligator clamps 8, 10. For example, switch 52 is coupled to one of the cables attached to one of clamps 8, 10. Resistor 50 and capacitor 48 are coupled to the other of the cables and connected in series with switch 52. Switch 52 may be a momentary switch that when depressed, charges capacitor 48 through resistor 50. The charging of capacitor 48 turns transistor 53 into a conducting state. The current flow from phototransistor 22 in the opto-isolator 16 is thus short-circuited across the control electrodes of the FETs 12a-12d, turning the FETs 12a-12d into a non-conducting state. Thus, the connection between the two batteries 2, 11 is open circuited and the alligator clamps 8, 10 can be safely removed from depleted battery 11.

Further, an indicator for indicating it is safe to remove the alligator clamps from the depleted battery 11 may also be provided. In FIG. 4, the indicator includes LED 54, resistor 56 and transistor 58 coupled in series between the cables. A control electrode of the transistor 58 is coupled to switch 52. When switch 52 is depressed, transistor 58 is turned on by the current flow through the switch 52. Current thus flows through the transistor 58 and resistor 56, illuminating LED 54. Illuminated LED 54 indicates it is safe to remove the alligator clamps 8, 10 from the depleted battery 11.

Figure 5:
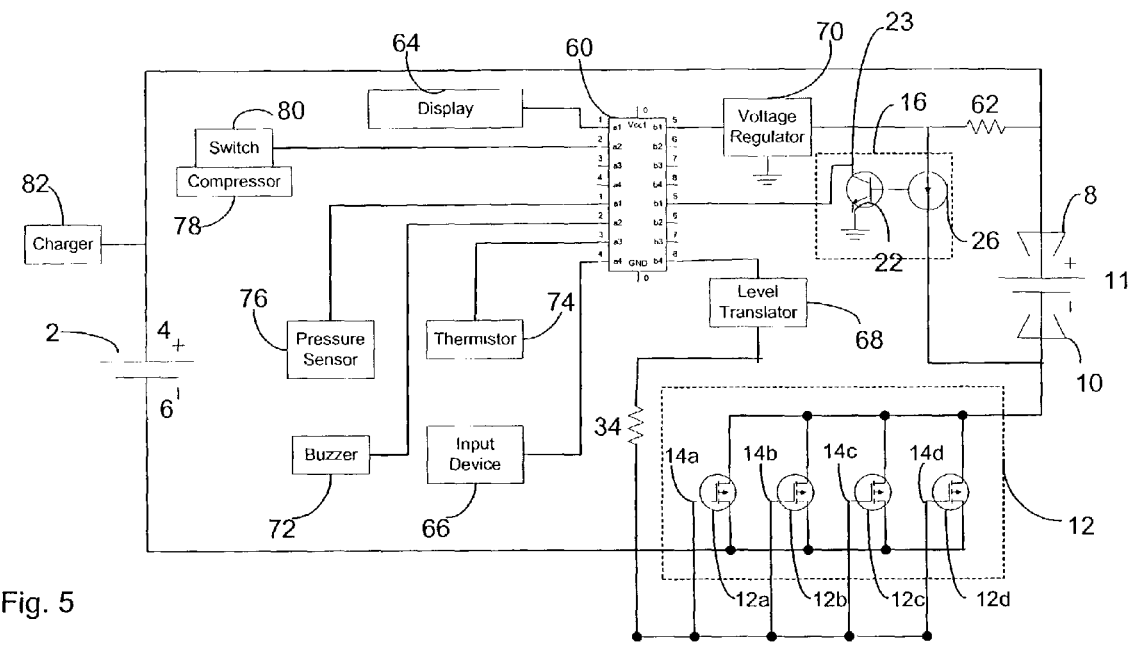
FIG. 5 is a circuit schematic that illustrates a microprocessor controlled booster system according to another embodiment of the invention.

Referring now to FIG. 5, an example of a microprocessor controlled jump starter system according to an embodiment of the invention is described. The microprocessor 60 can be programmed to perform essentially all of the control functions needed for operation of the jump starter. A display 64 and an input device 66 may be coupled to the microprocessor 60 to enable an operator to receive information from and input information into the microprocessor 60, respectively.

By way of a feedback circuit or other means, the microprocessor 60 can monitor the voltage and/or current being supplied to the depleted battery 11 from the booster battery 2, the voltage and/or current of the battery 11 and can detect short circuits or other faults, as described in more de tail below. A resistive divider may be used to provide the voltage and current measurements to the microprocessor's A/D input. A visual or audio indication of the faults is given, for example on display 64. A scrolling message describing the fault, a representative code, or other message may be displayed.

In this embodiment, microprocessor 60 is used to control the switch 12. Opto-isolator 16 is coupled to clamps 8, 10 via resistor 62 such that LED 26 is forward biased when a correct polarity connection between the boosting battery 2 and the depleted battery 11 is made. When forward biased, LED 26 turns on phototransistor 22. The collector 23 of the phototransistor 22 is coupled to a supply voltage via internal circuitry in the microprocessor 60. When the phototransistor 22 is on, a first signal of a first voltage is present at the collector 23 and is sensed by the microprocessor 60. When the phototransistor 22 is off, a second signal of a second voltage is present at the collector 23 and is sensed by the microprocessor 60. The microprocessor 60 provides output signals to activate the switch 12 into a conducting state when it receives the first signal and provides an output signal to deactivate the switch 12 into a non-conducting state when it receives the second signal. Additionally, the microprocessor can deactivate switch 12 to terminate the jump starting process when a fault is detected.

The output signals from the microprocessor 60 to control switch 12 are provided to control electrodes 14a-14d of transistors 12a-12d, as shown in FIG. 5. The control electrodes 14a-14d of the transistors are electrically connected to the microprocessor 60 via a level translator 68. Microprocessors normally run on low voltages, e.g., 5 volts. A low voltage power supply is provided to the microprocessor 60 from battery 2 via a voltage regulator 70. The low voltage output signals from the microprocessor 60 should be translated to higher voltages before being supplied to the transistors 12a-12d. The level translator 68 translates the output voltage of the microprocessor 60 to the higher levels that are needed to operate transistors 12a-12d. Accordingly, the output signals from the microprocessor 60 are used by the level translator 68 to generate control signals for the control electrodes of the FETs.

If the polarity connections of clamps 8, 10 to the depleted battery 11 are not correct, the switch 12 remains off. The display 64 may be controlled by the microprocessor 60 to display a message indicating reverse polarity. The microprocessor 60 may additionally activate an alarm such as buzzer 72 in response to the incorrect polarity connection.

Microprocessor 60 can be programmed to detect if clamps 8, 10 are connected to a battery or have been disconnected. To perform the detection, the microprocessor 60 deactivates the switch 12 into a non-conducting state. Via the feedback circuit or other means, the microprocessor detects whether clamps 8,10 are connected to a battery. If no battery is present, the switch 12 is placed in a non-conducting state, that is, all the FETs 12a-12d are placed in a non-conducting state. If a battery is present, the jump starting process continues. The check is preferably performed about once a second and takes less than a few thousandths of a second to complete. As such, the check is transparent to the operation of the jump starter. A comparator or operational amplifer can also be used to perform this check.

The microprocessor 60 may also be used to conduct a test of an alternator of a vehicle. When the alternator of a vehicle is working properly, the voltage level of the depleted battery 11 rises rapidly immediately after the battery is jump-started. The rapid rise in voltage can be detected by the microprocessor 60 based on the signals the microprocessor receives from opto-isolator circuit 16. If a rapid rise in voltage is detected, a message that the alternator is working properly may be shown on display 64. If no rapid rise in voltage is detected, then a message that the alternator may be malfunctioning can be shown on display 64. The rapid rise in voltage may vary depending on how depleted the battery 11 is. The microprocessor is preferably programmed to account for this variance.

According to a further embodiment of the invention, the booster system may include a freon gas leakage sensor. The sensor 74 may comprise a thermistor for sensing temperature changes due to the extreme cold produced at the point of a freon leak. The sensor 74 may alternatively comprise a transducer, such as a pressure transducer, to sense the point of a freon leak, since freon is under a high pressure in the system and the point of a leak presents a high pressure zone. The sensor is coupled to the microprocessor 60. The sensor generates an electrical signal upon detection of some physical change, e.g., a temperature or pressure change accompanying freon gas leakage. Upon receiving such a signal from the sensor 74, the microprocessor 60 may cause a message indicating a leak to appear on the display 64.

According to another embodiment of the invention, the booster system includes means for checking the inflation of the tires of the vehicle. An air pressure sensor 76 may be provided to measure the air pressure of the tires. The air pressure sensor 76 is coupled to an input of the microprocessor 60. The microprocessor 60 receives an air pressure measurement from the air pressure sensor 76 and displays the air pressure to the operator via display 64. Additionally, a built-in compressor 78 can be connected to the microprocessor 60 through a switch 80. According to this embodiment of the invention, a desired pressure is selected via the input device 66. The compressor 78 is then controlled by microprocessor 60 to inflate the tire to the selected air pressure. The compressor 78 is automatically deactivated by the microprocessor 60 when the desired pressure is attained.

According to yet another embodiment of the invention, the microprocessor 60 can be programmed to detect the charge levels of the boosting battery 2 and the depleted battery 11. The detected charge levels can then be communicated to an operator via display 64. Voltage regulator 70 is coupled to the boosting battery 2 and the depleted battery 11 for detecting their charge levels.

In order to measure the charge level of the boosting battery 2, clamps 8, 10 should be disconnected from the depleted battery 11. The voltage regulator then produces a voltage proportional to the voltage of the boosting battery 2, and which is within the operating range of the microprocessor 60. The microprocessor 60 is programmed to detect when the voltage of the boosting battery 2 falls below a predetermined level, for example, about 80% of its rated value. The buzzer 72 or other device can then be activated to indicate to the operator that the charge of the boosting battery 2 is low and that it should be recharged. The booster system may be plugged into a standard 110/220-volt electrical outlet via a standard wall charger 82 to recharge the boosting battery 2.

In order to measure the voltage of the depleted battery 11, switch 12 between the boosting battery 2 and the depleted battery 11 should be in a non-conducting state. Microprocessor 60 can be controlled via operator input from input device 66 to place switch 12 in a non-conducting state. Clamps 8, 10 are then connected to the depleted battery 11. The voltage regulator produces a voltage proportional to the voltage of the depleted battery 11. The microprocessor 60 receives this signal from the voltage regulator 70 and determines and displays the voltage of the depleted battery 11 on display 64.

The microprocessor 60 can also be programmed to detect a bad battery or a battery whose voltage is too low to be jump started. Normally, even a dead battery has some voltage, usually about 3-5 volts. Occasionally, however, a battery does not have any voltage as it is so deeply depleted that the battery is totally dead. This type of battery cannot be immediately jump started, and sometimes it can not even be charged at all. When the clamps 8, 10 are connected to this type of battery, it is as if the jump starter is not connected to anything. As the voltage of such a battery is extremely low, the microprocessor 60 does not detect any voltage at the clamps 8, 10. A fault is displayed if an attempt is made to jump start a vehicle with this type of battery.

This type of fault may also be detected if there is no battery connected to clamps 8,10 or a poor connection is made to the depleted battery 11 and the jump starter is activated. When the fault occurs, the microprocessor 60 can be programmed to terminate the jump starting process and to display a suggestion to a user that the battery be reconditioned before jump starting is attempted or to check if the clamps 8, 10 are properly connected to the battery 11.

In another embodiment of the invention, the microprocessor 60 is programmed to determine the cold-cranking amps (CCA) available from the depleted battery 11. CCA is the amount of power exerted by a battery when starting a vehicle on a cold day. The definition by Battery Council International (BCI) is the discharge load in amperes which a new fully charged battery at 0 degrees Farenheit can deliver for 30 seconds and maintain a voltage of 1.2 volts per cell or higher.

CCA is determined in the described embodiment by connecting a resistance in parallel with the battery 11. The resistance should be connected for a short period of time so not to drain the battery. The voltage of the battery is determined when under the load of the resistance. The lower the voltage of the battery under the load is, the lower the CCA of the battery is. The microprocessor is programmed to correlate the measured voltage to a CCA value. The CCA value may then be displayed to the user.

If a battery has a shorted cell, it is unlikely that the battery voltage will increase as it is attempted to provide a charge to the battery and jump start the vehicle. However, a charge must be provided to the battery for some period of time before it can be determined if the battery has a shorted cell. The microprocessor 60 can be programmed to monitor the voltage, current, and time of charging to detect a shorted cell. If a charge rate of the battery is greater than a predetermined current, the battery has been charging more a predetermined amount of time, and the voltage of the battery is less than or equal to a predetermined voltage, a shorted cell is detected. For example, if the charge rate of the battery is greater than 2 amps, the battery has been charging for more than 1 hour, and the voltage of the battery is less than or equal to about 11 volts, the jump starting process is terminated, and a shorted cell fault is indicated to the user.

The process for detecting an open cell battery is similar to the process for detecting a shorted cell battery. An open cell battery has some voltage due to leakage between the open cell and its connectors. However, the open cell battery does not have the ability to either accept or deliver current. When the jump starter is connected to an open cell battery, the microprocessor detects a voltage at the clamps 8, 10, but when the jump starting process begins, no appreciable current is detected. If no current is detected after a predetermined period of time, for example five minutes, an open cell battery is detected, the jump starting process is ended, and the appropriate fault displayed.

Many vehicles have interface ports for providing basic engine diagnostic data. The jump starter system may further have an interface for downloading basic engine diagnostic data from an interface port of such vehicles. The jump starter system may additionally have a printer port for printing information for record keeping or analysis. Memory inside the microprocessor 60 can be used for storing data that is used for later review and analysis.

Further, the microprocessor 60 may run a self-test on the booster to determine whether all components of the booster system are running properly. Each component is turned on and off quickly to determine if any malfunctions exist. Results of the self-test may be displayed on the display 64. Buzzer 72 or another alarm may be activated to indicate any malfunctions.

Also, the microprocessor 60 can be programmed to sound the buzzer 72 or other alarm when there is information shown on the display 64 and when there is an error/fault condition, such as detection of a low charge level of the changing battery 2 or detection of a bad alternator.

In another embodiment, the microprocessor 60 controls a de-sulfating process. The electrode plates of lead-acid vehicle batteries collect sulfur deposits over time which eventually render the battery useless. However, by removing the sulfur deposits from the plates, such a battery can be rejuvenated, that is, re-conditioned. It is known that battery reconditioning can be achieved by applying periodic short current bursts (on the order of microseconds) from the boosting battery 2 to the depleted battery 11. According to this embodiment of the invention, the microprocessor 60 is programmed to initiate the de-sulfating process through its control of the switch 12 and to display a "de-sulfating in progress" message on the display 64. An exemplary embodiment of circuitry that may be used to perform the de-sulfating process is shown in FIG. 6.

Figure 6:
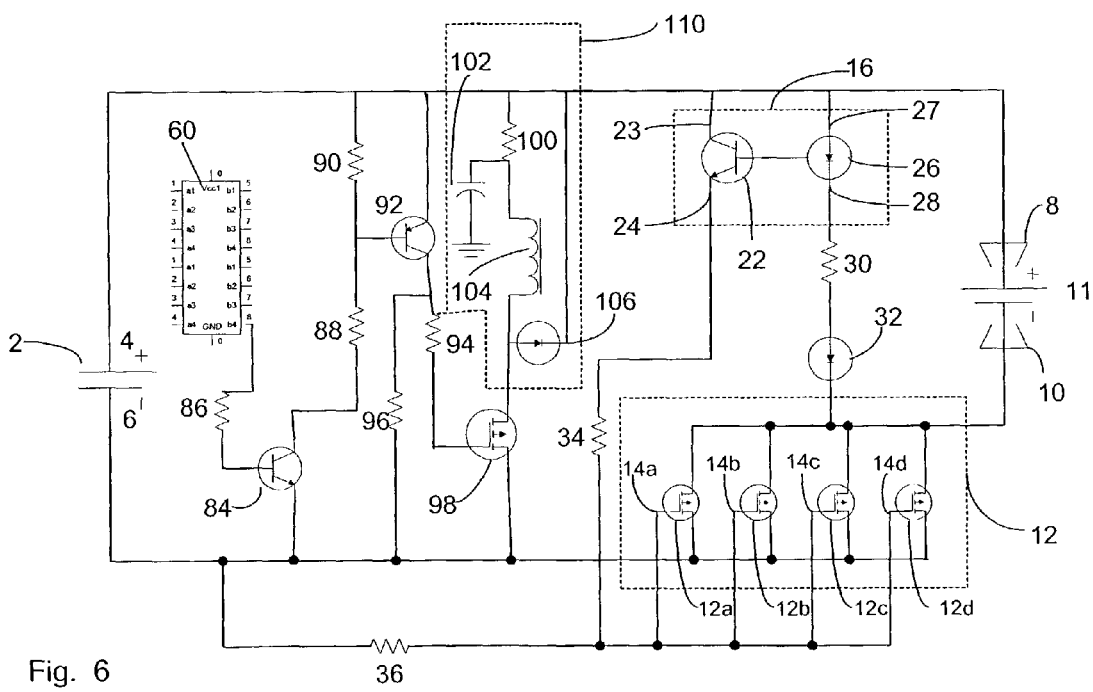
FIG. 6 is a circuit schematic that illustrates a microprocessor controlled booster system according to another embodiment of the invention.

FIG. 6 includes many of the same components discussed above in regard to the preceding figures. In addition to those components, a transistor 84 is coupled to microprocessor 60 via resistor 86. Microprocessor 60 outputs a signal to a control electrode of transistor 84, turning transistor 84 on and off. When transistor 84 is turned on, current flows through resistors 88 and 90, turning on transistor 92. In turn, current flows through transistor 92, and resistors 94 and 96, turning on transistor 98. Transistor 98 acts as a switch for activating a pulse generating circuit 110 that generates a pulsing current used to condition the battery 11. When transistor 98 is in a conducting state, current flows through resistor 100, capacitor 102, inductor 104, and diode 106, which comprise the pulse generating circuit 110, to generate a current pulse.

The display 64, which may be, for example, a scrolling or flashing display, displays information available to the microprocessor 60 which may include, but which is not limited to, results of the self test, the status or condition (e.g., percent of charge) of the jump starter battery 2 as well as of the depleted 11, a "Warning: Reverse Polarity" message if a polarity of connections of the jump starter system is not correct, a "Ready to Start" message when everything is properly connected, a "De-Sulfating in Progress" message when a de sulfating process is in progress, and various other diagnostics including, for example, detection of a bad alternator, desired and actual pressure readings from those jump starter systems that have air compressors and/or pressure sensors, and freon gas leakage readings for those jump starter systems that have freon gas leakage sensors.

In summary, the microprocessor can be programmed to control the polarity protection operation, performing of diagnostics of the vehicle battery and other systems, scanning of the display, various functions of the microprocessor initiated by operator input through the input device, conducting a de-sulfating process, activating the buzzer or other alarm, detection of freon leaks, basic engine diagnostics which may interface with the vehicle's interface port, recharging the jump starter battery, and inflation of tires based on a stored value or on user input. The above listing of functions is intended to be exemplary and is not exhaustive of the types of functions that the microprocessor can control in the context of the jump starter system disclosed herein.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

We claim:

1. A polarity detection circuit, comprising:
   cables for connecting a first battery to a depleted battery;
   a polarity sensing circuit coupled to the first battery for providing an enable signal when a correct polarity connection is made between the first battery and the depleted battery;
   a semiconductor device coupled to the polarity sensing circuit, the semiconductor device passing charging current flow between the first battery and the depleted battery when it receives the enable signal;
   a frequency generator coupled to one of the cables and injecting a signal of a predetermined frequency into that cable; and
   a frequency detector coupled to the other one of the cables, the frequency detector preventing the semiconductor device from permitting current flow between the first battery and the depleted battery when the frequency detector ceases to detect the signal of predetermined frequency injected by the frequency generator.

2. The polarity detection circuit of claim 1, further comprising:
   a safety switch that when activated prevents the semiconductor device from permitting current flow between the first battery and the depleted battery.

3. The polarity detection circuit of claim 1, wherein the polarity sensing circuit comprises an opto-isolator.

4. The polarity detection circuit of claim 1, wherein the polarity sensing circuit comprises an LED coupled to one of the cables, the LED being forward biased when a correct polarity connection is made between the first battery and the depleted battery; and
   a phototransistor coupled to the LED, current flow through the forward biased LED turning on the phototransistor to provide the enable signal.

5. The polarity detection circuit of claim 1, wherein the semiconductor device comprises at least one transistor.

6. The polarity detection circuit of claim 5, wherein the current from the first battery flows through the at least one transistor to the depleted battery.

7. The polarity detection circuit of claim 1, wherein the semiconductor device comprises at least one FET having a control electrode, the control electrode receiving the enable signal to place the FET into a conducting state.

8. The polarity detection circuit of claim 7, wherein the FET is a part of a current path between the first battery and the depleted battery.

9. A portable booster apparatus, comprising:
   means for providing power;
   means for connecting the means for providing power to a depleted battery;
   means for detecting polarity of the connection between the means for providing power and the depleted battery and for generating an enable signal when a correct polarity is detected; and
   at least one FET having a control electrode and being coupled to the means for detecting polarity, the control electrode receiving the enable signal and placing the FET into a conducting state in which charging current flow passes through the FET between the means for providing power and the depleted battery; and
   means for injecting a signal of a predetermined frequency into the means for connecting; and
   means for detecting frequency coupled to the means for connecting on an opposite side of the depleted battery than the means for injecting, the means for detecting placing the FETs into a non-conducting state when the means for detecting ceases to detect the frequency from the means for injecting.

10. The booster apparatus of claim 9, further comprising means for indicating a correct polarity connection to a user.

11. The booster apparatus of claim 10, wherein the means for indicating comprises a LED.

12. The booster apparatus of claim 9, further comprising means for interrupting current flow after a correct polarity connection has been established.

13. The booster apparatus of claim 12, and wherein the means for interrupting comprises a microprocessor programmed to place the FET in a non-conducting state if no depleted battery is present and further comprising at least one sensor connected to an input of the microprocessor for producing a measured signal representing the presence of the depleted battery at the means for connecting.

14. The booster apparatus of claim 12, further comprising an indicator for indicating when current flow has been interrupted.

15. The booster apparatus of claim 9, wherein the means for detecting polarity comprises an opto-isolator.

16. The polarity detection circuit of claim 1, wherein the depleted battery has terminals and is in a vehicle containing an alternator electrically coupled to the depleted battery, and further comprising a processor to receive a measured voltage at the terminals of the depleted battery via the cables to test alternator operation in dependence of the voltage at the depleted battery after the vehicle has started.

17. The polarity detection circuit of claim 16, further including a display coupled to the processor to indicate alternator functionality.

18. The polarity detection circuit of claim 17, wherein the processor determines a possible malfunction of the alternator if a rapid rise in voltage is not detected at the depleted battery after the vehicle is started, and the malfunction is shown on the display.

19. The polarity detection circuit of claim 17, wherein the processor determines that the alternator is operating properly if a rapid rise in voltage is detected at the depleted battery after the vehicle is started, and the proper operation of the alternator is shown on the display.

20. A portable booster apparatus, comprising:
    means for providing power;
    means for connecting the means for providing power to a depleted battery;
    means for detecting polarity of the connection between the means for providing power and the depleted battery and for generating an enable signal when a correct polarity is detected;
    at least one FET having a control electrode and being coupled to the means for detecting polarity, the control electrode receiving the enable signal and placing the FET into a conducting state in which charging current flow passes through the FET between the means for providing power and the depleted battery;

means for injecting a signal of a predetermined frequency into the means for connecting; and means for detecting frequency coupled to the means for connecting on an opposite side of the depleted battery than the means for injecting, the means for detecting placing the FETs into a non-conducting state when the means for detecting ceases to detect the frequency from the means for injecting; and means for interrupting current flow after a correct polarity connection has been established;

wherein the means for interrupting comprises a momentary switch adapted to short circuit the control electrode of the FET when depressed.

21. A portable booster apparatus, comprising:

means for providing power;

means for connecting the means for providing power to a depleted battery;

means for detecting polarity of the connection between the means for providing power and the depleted battery and for generating an enable signal when a correct polarity is detected; and at least one FET having a control electrode and being coupled to the means for detecting polarity, the control electrode receiving the enable signal and placing the FET into a conducting state in which charging current flow passes through the FET between the means for providing power and the depleted battery;

means for injecting a signal of a predetermined frequency into the means for connecting; and means for detecting frequency coupled to the means for connecting on an opposite side of the depleted battery than the means for injecting, the means for detecting placing the FETs into a non-conducting state when the means for detecting ceases to detect the frequency from the means for injecting;

comprising means for interrupting current flow after a correct polarity connection has been established;

wherein the means for interrupting comprises a microprocessor programmed to place the FET in a non-conducting state if no depleted battery is present and further comprising at least one sensor connected to an input of the microprocessor for producing a measured signal representing the presence of the depleted battery at the means for connecting;

wherein the microprocessor is programmed to place the at least one FET in a non-conducting state, then check the measured signal about once every second, and place the at least one FET in a conducting state if a depleted battery is present.

* * * * *